Aug. 27, 1929.  C. L. KENNEDY  1,726,232
INDUCTION MOTOR
Original Filed Oct. 15, 1926
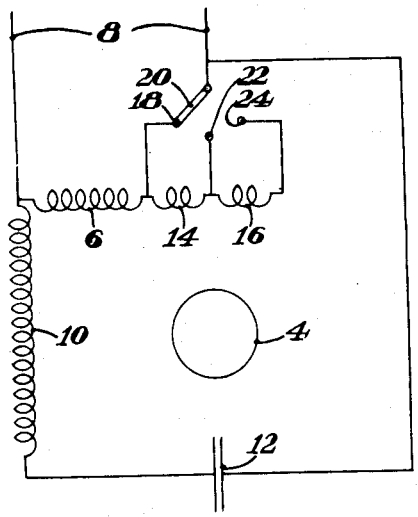
Witness
Helmar Van Dine.
Inventor
Carlton L. Kennedy
by Van Everen Fish
Hildreth Hoar Attys.

Patented Aug. 27, 1929.

1,726,232

UNITED STATES PATENT OFFICE.

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS.

INDUCTION MOTOR.

Original application filed October 15, 1926, Serial No. 141,757. Divided and this application filed March 19, 1929. Serial No. 348,315.

The present invention relates to induction motors and more particularly to single phase induction motors of the type disclosed in the co-pending applications of Carlton L. Kennedy, Serial Nos. 141,755 and 141,757, filed October 15, 1926 of which latter application this is a division.

The object of the present invention is to provide a single phase induction motor having provision for efficient variation of speed. To this end the present invention consists in the induction motor hereinafter described and particularly defined in the claims.

The accompanying drawing is a diagram of the circuit arrangement of the preferred form of induction motor according to the present invention.

According to the present invention the induction motor comprises a main stator winding which may also be called a line winding and a condenser circuit which includes a condenser and an auxiliary stator winding in space quadrature to the line winding. The auxiliary winding is arranged to have considerably more turns than the line winding and the condenser capacity is preferably of such value that the terminal voltage across the auxiliary winding under normal running conditions will be approximately equal to that across the line winding multiplied by the turns ratio of the windings. This terminal voltage across the auxiliary winding is made up of several components, one of which is the voltage induced through the transformer action of the rotor and another of which is the rise in voltage by the passage of a leading current through the condenser.

Under these conditions, the two windings deliver approximately equal amounts of energy and the motor operates at maximum efficiency and at its most favorable power factor. According to the present invention, means are provided for altering the voltage or current relations of the line winding independently of the impressed voltage on the auxiliary winding. Under such conditions, the slip of the rotor will be increased, particularly if the rotor has a high resistance, and this action takes place without appreciable unbalancing of the separate windings, the reduced speed serving to induce a lower voltage in the auxiliary winding to balance the reduced energy delivered to the line winding.

The motor comprises a rotor 4, a main winding 6 adapted to be energized from the supply line 8, an auxiliary winding 10 and a condenser 12, all of which are or may be as shown and described in the co-pending applications above referred to. The condenser circuit, including the winding 10 and condenser 12 is connected across the line 8. The main winding 6 is connected in series with additional sections 14 and 16 which provide a variable number of turns for the line winding. The main portion 6 of the line winding is connected to a contact point 18 of a switch 20 while the portions 14 and 16 are connected to contacts 22 and 24. The main portion 6 is employed for operating the motor at its maximum speed and is energized when the switch is connected to contacts 18, the additional portions 14 and 16 being inoperative at this time. The constants of the condenser circuit are such that the auxiliary winding 10 has a considerably greater number of turns than the main portion of the line winding 6, preferably from two to five times the number, and the condenser 12 is of such a value as to provide for substantially equal amounts of energy delivered to the two windings 6 and 10, as described in the co-pending Kennedy applications. When the switch 20 is moved to point 22, the current in the line winding is decreased independently of the impressed voltage on the condenser circuit. However, the induced voltage and therefore the current in the auxiliary winding 10 by virtue of the decreased speed of the rotor and by virtue of the reduced ratio between the larger number of turns in the main winding and the condenser winding, is such as approximately to compensate for the reduction in current in the line winding, thereby maintaining an approximate balance at reduced speed. A further reduction of speed is accomplished by moving the switch 20 to contact 24 when the line voltage is impressed upon the entire line winding.

In order to produce an appreciable change in speed, it is desirable that the rotor be of a high resistance type. This may be conveniently carried out by making the rotor conductors of brass or similar material in place of the usual copper. The high resistance of the rotor also makes for high starting torque without necessity for altering circuit connections or providing auxiliary starting switches.

The invention having been thus described, what is claimed is:

1. An induction motor having, in combination, a rotor, a stator, a stator having a line winding and an auxiliary winding, a condenser in series with the auxiliary winding, the auxiliary winding and condenser forming a condenser circuit permanently connected across the line, and means for impressing the line voltage across a part only or the whole of the line winding to control the motor speed.

2. An induction motor having, in combination, a rotor, a stator, a stator having a line winding consisting of a main portion and additional portions in series therewith, an auxiliary winding on the stator electrically displaced from the line winding and having a greater number of turns than the main portion of the line winding, a condenser in series with the auxiliary winding, and means for selectively impressing a line voltage on the main portion only of the line winding or on the main portion and additional portions thereof while maintaining a constant impressed voltage on the auxiliary winding and condenser.

3. An induction motor having, in combination, a stator having a line winding and an auxiliary winding, a condenser circuit including the auxiliary winding and a condenser in series therewith, and means for impressing the line voltage on a part only or the whole of the line winding while maintaining constant voltage on the condenser circuit to control the speed.

In testimony whereof I have signed my name to this specification.

CARLTON L. KENNEDY.